United States Patent [19]

Iwasa et al.

[11] Patent Number: 5,744,763
[45] Date of Patent: Apr. 28, 1998

[54] SOUNDPROOFING INSULATOR

[75] Inventors: Tadanobu Iwasa, Ichinomiya; Fujio Ninomiya, Aichi-ken; Zenichi Yasuda, Gifu; Yutaka Ogasawara, Ogaki; Masasumi Kokawa, Aichi-ken; Kazuya Watanabe, Inazawa, all of Japan

[73] Assignee: Toyoda Gosei Co., Ltd., Aichi-ken, Japan

[21] Appl. No.: 551,034

[22] Filed: Oct. 31, 1995

[30] Foreign Application Priority Data

| Nov. 1, 1994 | [JP] | Japan | 6-269059 |
| Nov. 1, 1994 | [JP] | Japan | 6-269061 |
| Mar. 14, 1995 | [JP] | Japan | 7-054679 |
| Mar. 31, 1995 | [JP] | Japan | 7-075546 |
| May 10, 1995 | [JP] | Japan | 7-112109 |
| May 15, 1995 | [JP] | Japan | 7-116190 |
| May 15, 1995 | [JP] | Japan | 7-116191 |
| May 15, 1995 | [JP] | Japan | 7-116193 |

[51] Int. Cl.$^6$ .................................................. E04B 1/82
[52] U.S. Cl. ........................ 181/286; 181/290; 181/294
[58] Field of Search ................................ 181/200, 202, 181/204, 205, 207, 208, 286, 290, 293, 294, 295

[56] References Cited

U.S. PATENT DOCUMENTS

| 3,961,682 | 6/1976 | Dausch et al. | 181/286 |
| 4,441,581 | 4/1984 | Sommerhalder | 181/286 |
| 4,463,049 | 7/1984 | Kracke | 181/286 X |
| 4,705,139 | 11/1987 | Gahlau et al. | 181/290 |
| 5,272,284 | 12/1993 | Schmanski | 181/286 X |
| 5,483,028 | 1/1996 | Holwerda | 181/207 |
| 5,484,970 | 1/1996 | Suzuki et al. | 181/294 |

FOREIGN PATENT DOCUMENTS 2-7700  1/1990  Japan.

OTHER PUBLICATIONS

Patent Abstracts of Japan, Publication No. 06298014 A, Oct. 25, 1994, Kazuhiro et al., Soundproof Member for Vehicle.
Patent Abstracts of Japan, Publication No. 06336143 A, Dec. 6, 1994, Ryuji et al., Sound-Arresing Member for Engine Room.

*Primary Examiner*—Khanh Dang
*Attorney, Agent, or Firm*—Cushman Darby & Cushman IP Group of Pillsbury Madison & Sutro LLP

[57] ABSTRACT

A soundproofing material 10 is applied to a vehicle hood panel 14 on the side facing the engine compartment. The soundproofing material 10 as a whole has a sheet-like form and includes a pulverized rubber layer 11 containing rubber grains of various kinds of material, various sizes and various shapes and covering layers 12 which cover the pulverized rubber layer 11. Noises are absorbed topically by a number of rubber grains within the soundproofing material 10 and by air gaps present between the rubber grains. While noise generating sources such as an engine, an induction system unit, transmissions and so on are housed in the engine compartment, noises ranging over a plurality of wavelength are generated by them yet are absorbed by the pulverized rubber layer 11, because the pulverized rubber layer 11 contains a mixture of rubber grains of various kinds, various sizes and various shapes, and the frequency level of the noise to be absorbed by each rubber grain is different piece by piece.

14 Claims, 19 Drawing Sheets

—— Prior art
------ EPDM sponge (particle size 0.5mm~2.0mm)
------ EPDM solid (particle size 0.5mm or less)
---- NBR solid (particle size 0.5mm or less)
------ EPDM solid (particle size 0.5mm~2.0mm)

SOUNDPROOFING INSULATOR

BACKGROUND OF THE INVENTION

1. Field of the Invention

The present invention relates generally to soundproofing material for application to various members and a process for producing the same. More particularly, the present invention relates to soundproofing material to be applied, for example, to automobile hoods, roof panels, floor panels or engine covers, and to prevent noises from propagating outside or within the interior of the vehicle, as well as to a process for producing the same.

2. Description of the Related Art

Conventionally, sheet-like soundproofing material has been applied, for example, on the interior surface of an automobile hood facing the engine to prevent noises generated by the engine and auxiliary machinery from penetrating to the outside.

Such types of soundproofing material, for example, have included felt and glass wool. Meanwhile, as shown in FIG. 32, a soundproofing material 150 consisting of glass wool 151 covered with a felt layer 152 has also been employed. As the components of such soundproofing materials, those which correspond to the frequency of the generated noises tend to be employed. For example, a two-layer structure consisting of the glass wool layer 151 and the felt layer 152 is employed around the engine compartment while a vinyl chloride leather having numerous through holes is applied to the roof panel. Further, felt is used in the wheel housing and a three-layer structure consisting of asphalt, felt and carpet is applied to the floor panel.

Japanese Unexamined Utility Model Publication No. Hei 2-7700 discloses a standing wave absorbing member consisting of a synthetic resin shell formed by blow molding and granular shock absorbing material packed in the shell. The disclosed technique is directed to improve production and productivity, as well as the capability of absorbing the standing wave within the engine room.

More specifically, when the standing wave is transmitted to the inside of the shell, the grains of the shock absorbing material are caused to be rubbed against one another by the standing wave to generate frictional heat. Thus, the standing wave is attenuated when the kinetic energy of the standing wave is converted into thermal energy.

However, such conventional soundproofing materials sometimes unsuccessfully controlled noises under circumstances where noises ranged over different frequencies as are frequently generated from many noise sources as in the engine compartment where various units and parts including the engine and auxiliary machinery of the engine, transmission, are housed and collectively each producing a variety of noises at different frequency ranges.

In other words, the prior art soundproofing materials are directed to lower the overall noise level and are not based on a concept of screening and absorbing all of the noises of specific frequency generated from the respective units and parts. Accordingly, the prior art soundproofing materials have characteristics, for example as shown in FIG. 33, such that they have excellent capability of absorbing noises with relatively high frequency of 2 kHz or more but not of absorbing noises with relatively low frequency of less than 2 kHz.

Consequently, it occasionally happens that, even though some frequency of noises can be screened and absorbed, the noises of other frequency levels, for example, low frequency level noises which annoy the driver and those who are around the vehicle, cannot be screened and absorbed efficiently.

While the prior art soundproofing materials are formed flat or to conform to the shape of the hood panel, noises do not necessary impinge in a perpendicular manner on the soundproofing materials. Accordingly, when noises impinge upon soundproofing materials at relatively large incident angles, they are reflected readily and cannot be absorbed fully. Thus, sufficient characteristics cannot always be obtained with respect to soundproofing performance, particularly noise absorbing performance.

Further, the shell can be easily formed by blow molding in the technique disclosed in the above Japanese Utility model, using a resin sheet, film or the like. Accordingly, most of the noises generated in the engine room are actually reflected by the shell, resulting in the failure of exhibiting sufficient noise absorbing effect. In other words, noise waves reflected by the shell escape through some clearances, and thus the noises cannot be controlled.

SUMMARY OF THE INVENTION

Accordingly, it is a primary object of the present invention to provide soundproofing material which can efficiently screen and absorb noises, even when many noise sources are present and generate different frequency of noises.

It is another objective of the present invention to provide soundproofing material which efficiently absorbs noises, even when many noise sources are present to generate many different frequencies of noises and which exhibits sufficient soundproofing performance against noises impinging upon it at various incident angles.

It is a further objective of the present invention to provide a process for producing soundproofing material which can be formed to have any complicated three-dimensional shape and which can reduce production cost, increase flexibility of design and facilitate packing of rubber grains prepared by pulverizing rubbers.

According to an aspect of the present invention, soundproofing material is interposed between a source of noise and a member for supporting such material to foreclose transmittance of noise from the source to the support member. The soundproofing material has a multiplicity of elastic grains for absorbing the noise transmitted from a noise source, means for accommodating the elastic grains, the accommodating means have a first layer wall, which contacts the support member and a second layer wall facing the noise source.

According to another aspect of the present invention, soundproofing material is interposed between a noise source and a member supporting the soundproofing material to shut off transmission from the noise source to the support member. The soundproofing material has a first surface facing the noise source, a second surface in contact with the support member, a first layer formed from a non-woven fabric to absorb noise having a first frequency, a second layer, which is overlapping the first layer, to absorb noise having a second frequency but smaller than said first frequency.

According to still another aspect of the present invention, a method for manufacturing a soundproofing material which has a first surface, which is facing a source of noise and a second surface, which is attached to a member for supporting the soundproofing material, wherein the noise generated by the source is absorbed between the first surface and the second surface. The method includes the step of molding an outer block by blowing resin into a preselected shape which has an opening, a step of forming a multiplicity of through holes in the outer block, a step of filling up a multiplicity of rubbish particles with compressed gas in the outer block through the opening, each particle having a maximum width larger than a diameter of each of the through holes, and a step of sealing the opening.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

DETAILED DESCRIPTION OF THE PREFERRED EMBODIMENTS (First Embodiment)

Figure 1:
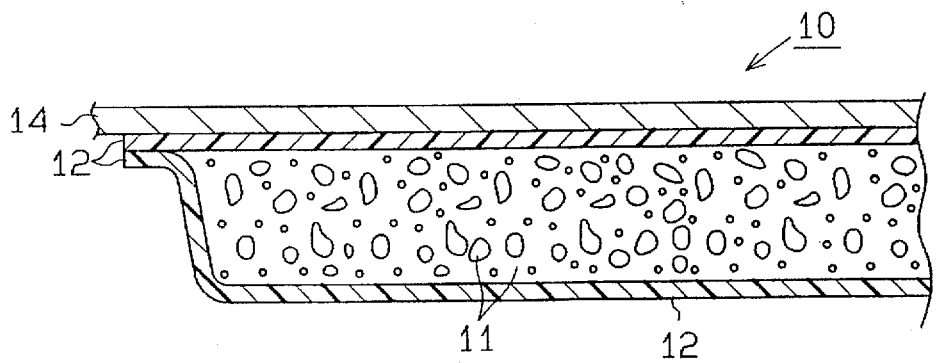
FIG. 1 is a schematic cross-sectional view of soundproofing material according to a first embodiment of the present invention.

A first embodiment of the present invention will be described below referring to FIGS. 1 and 2.

In the first embodiment, a soundproofing material 10 is applied to the inner surface of an automotive hood panel (bonnet) 14, facing toward the engine compartment. The soundproofing material 10 is directed to prevent noises generated from the engine, the induction system unit, the transmission and other engine related noise generators from propagating outside. The soundproofing material 10 as a whole has a sheet-like form and comprises a pulverized rubber layer 11 containing rubber grains of various kinds, of various sizes and of various shapes, and outer covering layers 12 covering the pulverized rubber layer 11.

The rubber grains constituting the pulverized rubber layer 11 are prepared by milling vulcanized rubbers in a pulverizer equipped with a cutter or a mortar, and have various shapes and sizes, with the greatest part having a diameter of about 2.0 mm in this embodiment. The pulverized rubber layer 11 contains a mixture of ethylene-propylene-diene copolymer rubber (EPDM), styrene-butadiene rubber (SBR) and nitrile rubber (NBR) grains. The rubber grains may also be comprised of natural rubbers, synthetic rubbers such as chloroprene rubber (CR) or elastic synthetic resins such as thermoplastic polystyrene (TPS), thermoplastic polyolefin (TPO) and polyurethane. The rubber structure can also comprise a mixture of solid rubber and sponge rubber particles.

Meanwhile, covering layers 12 in this embodiment can, for example, comprise a polyethylene terephthalate (PET) nonwoven fabric. The covering layers 12 alternatively may be a nonwoven or woven fabric, a net or a film of a synthetic resin material including polyesters such as polybutylene terophthalate (PBT), polyamides such as nylon, polyolefins such as polypropylene (PP) and polyvinyl chloride (PVC) or a natural fiber material including cotton, linen and various pulp based materials.

The upper and lower covering layers 12 are connected together to form a closed, hollow area therebetween by being fused or bonded to each other, for example, at the periphery, so that the rubber grains will not spill out. The soundproofing material 10 according to this embodiment is attached to the hood panel by convenient techniques including clips (not shown).

Next, actions and effects of the soundproofing material 10 according to the first embodiment will be described.

In this embodiment, the soundproofing material 10 attached to the hood panel 14 prevents noises generated in the engine compartment from propagating outside. In other words, the noises are topically absorbed, respectively, by a number of rubber grains themselves contained in the pulverized rubber layer 11 and by air gaps present between the grains. More specifically, when noise waves penetrate the covering layer 12 to impinge upon the pulverized rubber layer 11, they are transmitted to the rubber grains. Consequently, energy within such noises is absorbed by the viscosity resistance and heat transfer of the air present between the rubber grains. Alternatively, the rubber grains themselves vibrate finely to cause friction among the rubber grains which are in contact with one another, thereby converting the energy within the noises into vibrational energy and thermal energy.

Further, because various units such as the engine, the induction system unit and transmission as are housed in the engine compartment, noises of various frequency are generated form these various units in noise sources. However, since the pulverized rubber layer 11 according to this first embodiment contains a mixture of rubber grains of various kinds of materials, of various sizes and of various shapes, including both solid rubber and foam rubber, these grains respectively screen and absorb noises ranging over various frequency levels. Accordingly, even if some noises ranging over various frequency are generated in the engine compartment, these noises can be absorbed by the respective rubber grains having different acoustic absorptivity characteristics.

A test was carried out to confirm the above actions and effects. In this test, samples were prepared in which various kinds of rubber grains having different grain sizes and different structures are covered with the covering materials, respectively, and another sample, as the prior art technique, in which a glass wool layer is covered with a felt layer. Included were samples where the grains were comprised of EPDM foam rubber, EPDM solid rubber and NBR solid rubber, of varying size ranges. Other material could be used so long as it is elastic or soft, including all types of sponge rubber. Acoustic absorptivity of each sample was measured and the results are as shown in FIG. 2. The samples all had a thickness of 15 mm.

Figure 2:
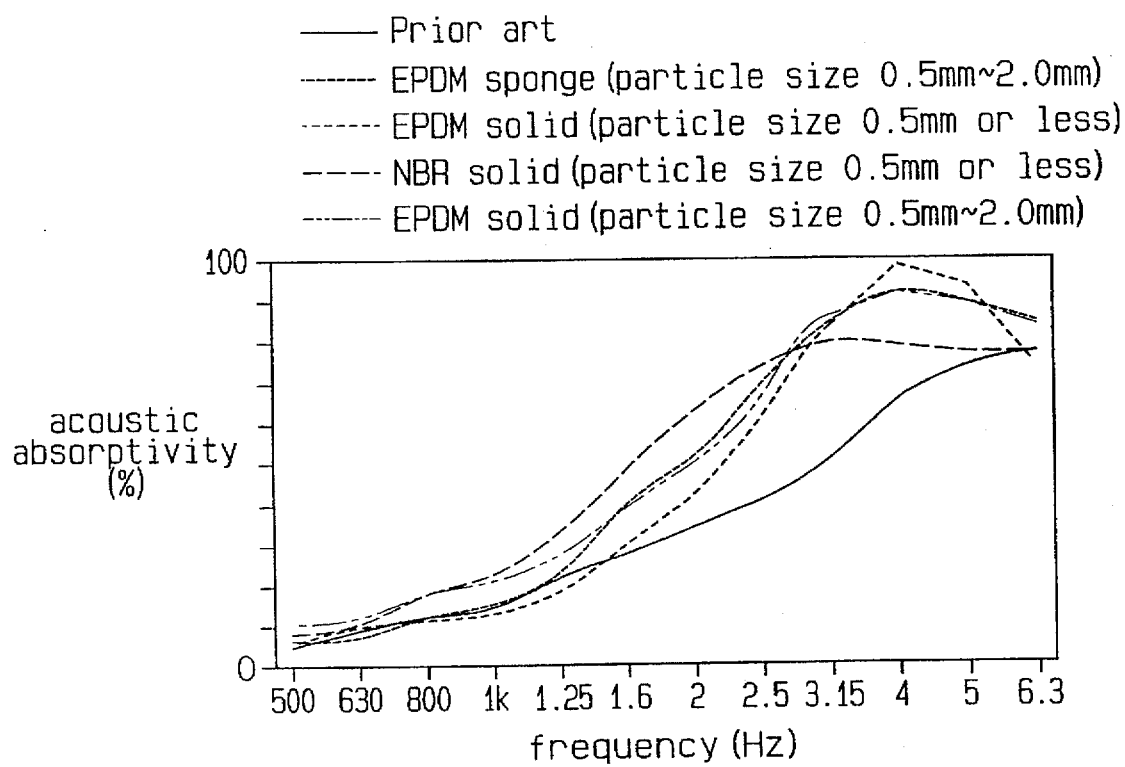
FIG. 2 is a graph showing a relationship of frequency vs. acoustic absorptivity in soundproofing materials containing various types of rubber grains according to the first embodiment.

As shown in FIG. 2, it can be appreciated that the samples prepared by covering rubber grains of different kinds, different grain sizes and different structures, with covers, respectively, exhibited generally high noise absorbing effects compared with the prior art sample. Since the rubber grains themselves independently have different acoustic absorptivity characteristics depending on the kind of material, grain size and their structures, noises ranging over a plurality of frequency can be surely absorbed by the respective rubber grains by mixing various kinds of rubber grains like in this embodiment.

(Second Embodiment)

Next, a second embodiment of the present invention will be described referring to FIG. 3. It should be noted here that, in the description of the following embodiments, where the basic structure of the soundproofing material is substantially the same as that in the first embodiment, including that shown generally at 20 in this second embodiment, similar parts of members are called the same and affixed with the same reference numbers, respectively. Accordingly, detailed descriptions of them will be omitted and differences will be mainly described below.

Figure 3:
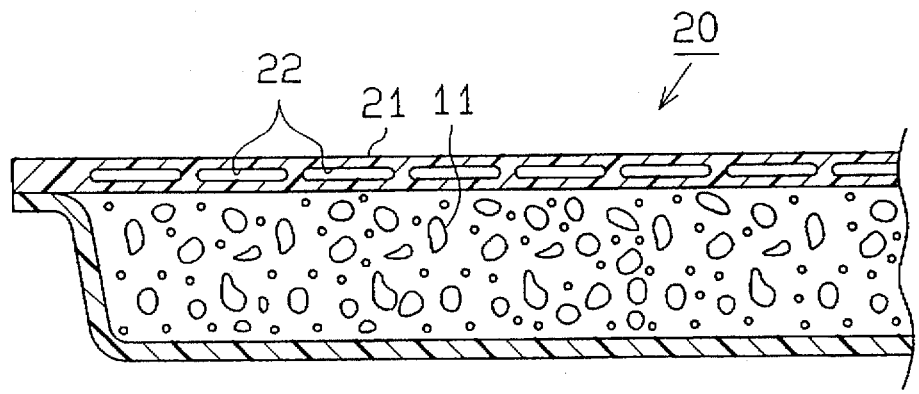
FIG. 3 is a schematic cross-sectional view of soundproofing material according to a second embodiment of the present invention.

In the second embodiment, as shown in FIG. 3, the soundproofing material 20 has a pulverized rubber layer 11 and covering layers 21 covering the layer 11. The covering layers 21 are preferably resin films. The upper layer 21 contains a plurality of spaced apart air pockets or chambers 22 which constitute secondary soundproofing means.

Accordingly, noises are also absorbed by the air pockets 22, and thus the actions and effects described referring to the first embodiment can be enhanced to allow noises to be absorbed more securely than in the first embodiment.

(Third Embodiment)

Figure 4:
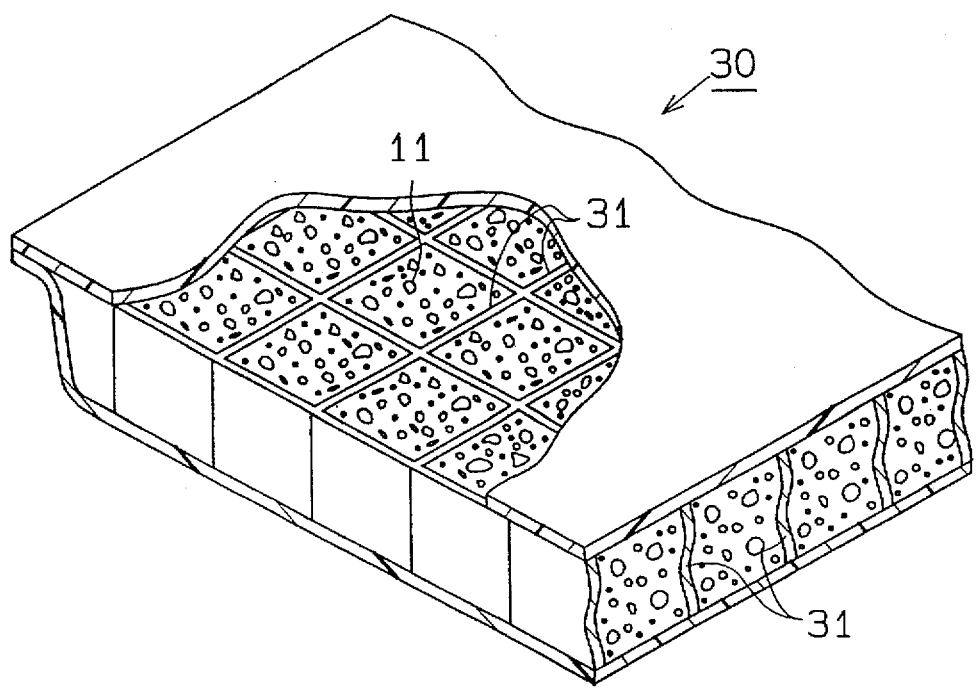
FIG. 4 is a partially cut-away schematic perspective view of soundproofing material according to a third embodiment of the present invention.

In a third embodiment, as shown in FIG. 4, the soundproofing material 30 also has a pulverized rubber layer 11 and covering layers 12 covering the layer 11. In this embodiment, a grid-like partition 31 is present within the pulverized rubber layer 11 and sandwiched between the upper and lower covering layers 12 to thereby divide the space in which the rubber grains are packed. The rubber grains thus contained in unit cells defined by the grid-like partition walls. Also, the grains are of different kinds, different grain sizes and different structures cell by cell. For example, the kind, grain size and structure of the rubber grains to be contained in the unit cells adjacent to the engine are different from those of the grains contained in the unit cells adjacent to the induction system because of the frequency differences of the resulting sounds. The engine will usually produce lower frequency noises while an induction system will produce higher frequency noise. Accordingly, the soundproofing material 30 shows different acoustic absorptivity characteristics suitable depending on the locations of the respective units (vibration generating sources), respectively.

The thus constituted soundproofing material 30 can be allowed to surely absorb noises having different frequency depending on the area like in the engine compartment by incorporating rubber grains of suitable kinds, grain sizes and structures corresponding to the frequency of the noises, respectively. Thus, generated noises can be efficiently absorbed.

Further, since the partition 31 is contained in the pulverized rubber layer 11 in this embodiment, the rubber grains can be restricted from migrating in the pulverized rubber layer 11, so that the above actions and effects can be maintained over an extended period.

(Fourth Embodiment)

Figure 5:
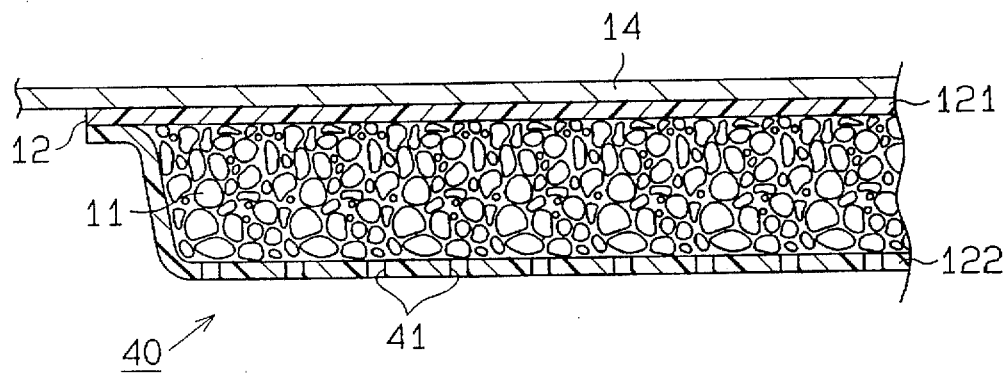
FIG. 5 is a schematic cross-sectional view of soundproofing material according to a fourth embodiment of the present invention.

A fourth embodiment of the present invention will be described referring to FIG. 5. In this embodiment, covering layers 12 are, for example, of polypropylene (PP) films. The covering layers 12 comprise an upper layer 121 to be brought into contact with a hood panel 14 and a lower layer 122 which is opposed to the engine, and they are fused to each other at the periphery.

In this embodiment, the lower layer 122 of the covering layers 12 has a plurality of through holes 41 formed therein. These through holes 41 are defined at a predetermined pitch and are designed to have a smaller diameter than the grain size of the rubber grains so that such grains may not spill out of the through holes 41. It should be noted that through holes 41 are depicted relatively large in FIG. 5 for convenience's sake.

Next, actions and effects of the thus constituted soundproofing material 40 according to the fourth embodiment will be described.

This embodiment, like any of the foregoing embodiments, also enjoys the basic effect that noises generated in the engine compartment are topically absorbed by a number of rubber grains themselves contained in the pulverized rubber layer 11 of the soundproofing material 40 and by air gaps present between those grains.

Particularly, in this embodiment, the lower cover layer 122 is perforated with through holes 41. Accordingly, noise waves, i.e., air compression waves, impinging upon lower layer 122 pass through the through holes 41 to be led easily into the pulverized rubber layer 11. Thus, the noise absorbing effect of the rubber grains is enhanced. In addition, since the through holes 41 have a relatively small size, the rubber grains do not spill out of the through holes 41 but can be securely retained in the space defined between the covering layers 12.

Besides, since the lower covering layer 122 has through holes 41, the soundproofing material 40 can be allowed to copy with noises ranging over various frequency by suitable changing the diameter of pitch of, that is the spacing between, the through holes 41.

Figure 6:
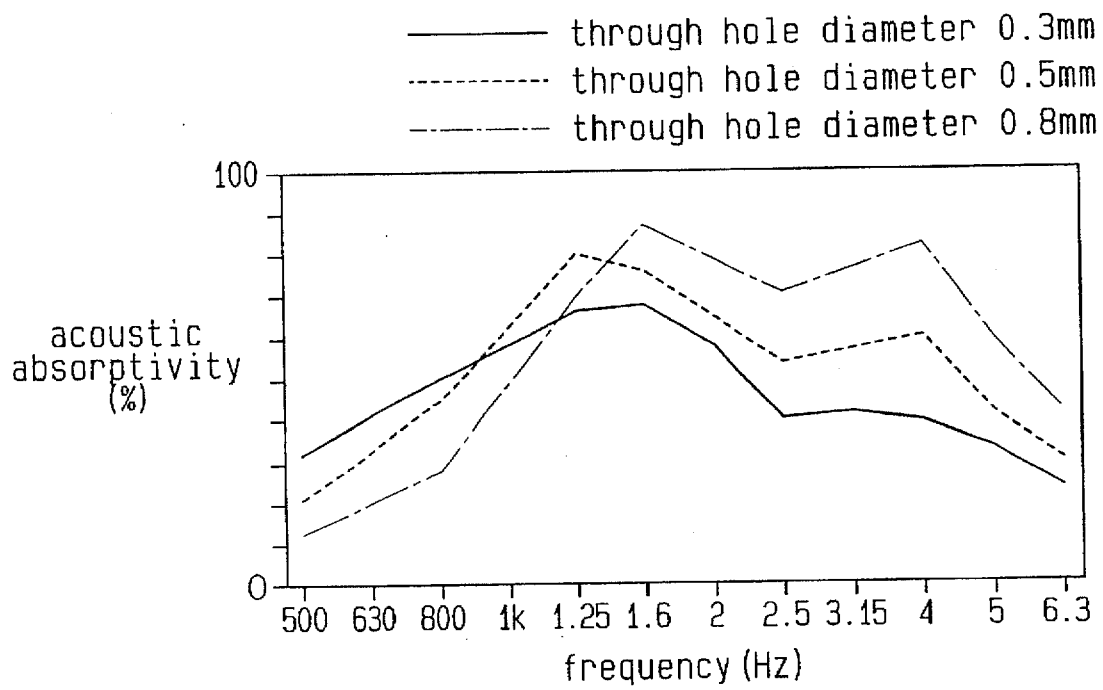
FIG. 6 is a graph showing a relationship of frequency vs. acoustic absorptivity in the soundproofing material according to the fourth embodiment, when the diameter of through holes is changed.
Figure 7:
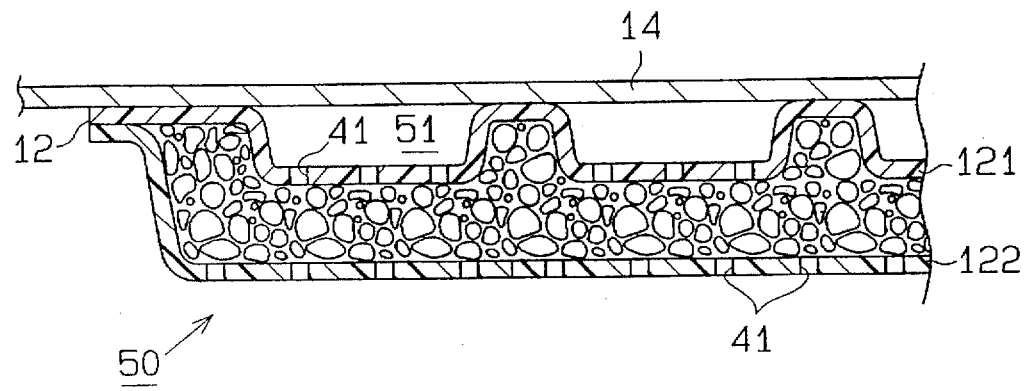
FIG. 7 is a schematic cross-sectional view of the soundproofing material according to a fifth embodiment of the present invention.
Figure 8:
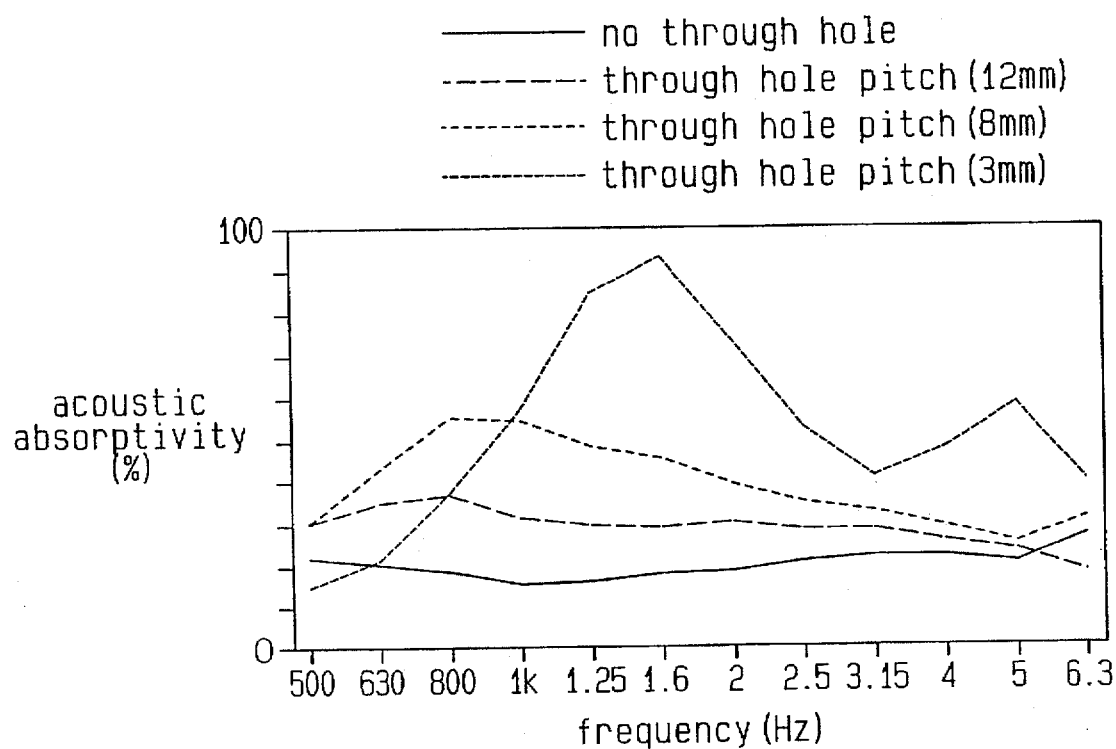
FIG. 8 is a graph showing a relationship of frequency vs. acoustic absorptivity in the soundproofing material according to the fifth embodiment, when the diameter of through holes is changed.

The following test was carried out so as to confirm the above actions and effects. In this test, samples were prepared in which the rubber grains are covered with covering layers 12 having different through hole diameters of 0.3 mm, 0.5 mm and 0.8 mm, and different through hole pitches or spacings, respectively, and a control (prior art product) to determine acoustic absorptivity, respectively. The results are as shown in FIGS. 6 and 8. The effect of air pockets 51, shown in FIG. 7, will be described later are formed in the samples with respect to FIG. 8. The samples had a thickness of 15 mm in FIG. 6 and 10 mm, respectively, in FIG. 8.

It can be understood from FIG. 8 that the samples covered with the covering layers 12 having through holes 41 generally show high soundproofing effects compared with the control having no through holes. Further, as shown in FIGS. 6 and 8, it can be appreciated that the samples shown different acoustic absorptivity characteristics depending on the size and pitch of the through holes 41. Accordingly, even if noises ranging over a plurality of frequency are generated, they can be securely screened and absorbed respectively by suitably selecting the diameter and pitch of the through holes 41.

(Fifth Embodiment)

Next, a fifth embodiment of the present invention will be described referring mainly to FIG. 7. As shown there, the soundproofing material 50 according to the fifth embodiment also has a pulverized rubber layer 11 and covering layers 12 covering the layer 11. The covering layers 12, like in the fourth embodiment, include an upper layer 121 and a lower layer 122, which are of PP films.

The greatest difference in this embodiment from the fourth embodiment is that a plurality of air pockets 51 are defined between the upper layer 121 and a support member such as hood panel 14. Further, not only the lower layer 122 but also the upper layer 121 contains through holes 41 at the portions facing the air layers 51.

The above-described structure exhibits the following actions and effects in addition to those described referring to the fourth embodiment. That is, the recessed and perforated upper layer 121, located opposite the noise impinging side, contains the through holes 41, and the air pockets 51 are defined by the upper layer 121 and the hood panel 14. Accordingly, noise waves which failed to be absorbed by the rubber grains pass through the through holes 41 of the upper layer 121 to impinge upon the air layers 51 where they are further partly absorbed. Meanwhile, the noises which failed to be absorbed in the air pockets 51 impinge upon the hood panel 14 and are reflected to pass back through the through holes 41 again into the pulverized rubber layer 11. As a result, the noise waves re-introduced into the pulverized rubber layer 11 are absorbed by the rubber grains to be screened and absorbed more securely, depending on the frequency of such noises.

The soundproofing material 50 according to this fifth embodiment is also adapted to cope with noises ranging over various frequency by changing the diameter or pitch of the through holes 41. Further, the air pockets 51 additionally provided in this embodiment are also adapted to cope with noises ranging over various frequency by suitable changing the size or thickness (height) of the air pockets 51.

Next, the following test was carried out so as to confirm the above actions and effects. In this test, samples were prepared in which the rubber grains are covered with covering layers 12 which contain air pockets 51 having a thickness of 5 mm and also through holes 41 at different lateral spacings, respectively. And the thus prepared samples were applied to panels corresponding to the hood panel 14 to measure acoustic absorptivity, respectively.

It is preferred that air pockets have the same shape as the soundproofing device, that is following the periphery of the soundproofing. However, the air pockets of the present invention can have a variety of shapes, independent from the peripheral shape of the soundproofing device.

There were also two samples attached to panels corresponding to the hood panel 14. Soundproofing materials 50 were prepared by covering the rubber grains with covering layers 12 which are 0.5 mm thick PP films having 0.5 diameter through holes 41 defined at a 4 mm pitch, in such a way that these samples may and may not employ air pockets 51 between the soundproofing materials 50 and the panels to measure acoustic absorptivity, respectively. The samples all had a thickness of 15 mm.

Figure 9:
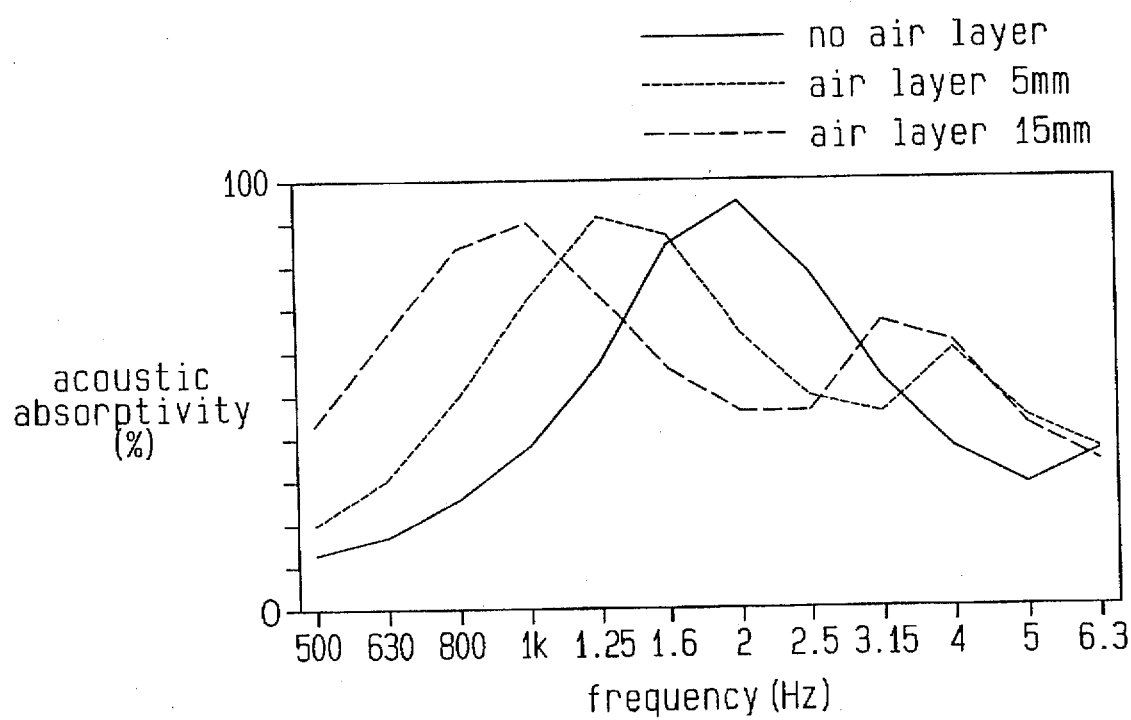
FIG. 9 is a graph showing a relationship of frequency vs. acoustic absorptivity in the soundproofing material according to the fifth embodiment, when the thickness of the air layer is changed.

The results are shown in FIGS. 8 and 9. As already described with respect to FIG. 8, it can be understood that the samples shown different acoustic absorptivity characteristics depending on the pitch of the through holes 41. Accordingly, if noises ranging over a plurality of frequencies are generated, they can be surely absorbed by defining the through holes at a suitable pitch. Meanwhile, as shown in FIG. 9, it can be understood that the frequency of noises to be absorbed shift to the lower region when the air pockets 51 are employed as opposed to the case where no air layer is employed. It can be understood also that the greater the thickness of the air pockets 51, the lower becomes the frequency level of absorbed noises. These data demonstrated that noises ranging over various frequencies can be absorbed by suitably changing the thickness or height of the air pockets 51.

(Sixth Embodiment)

Figure 10:
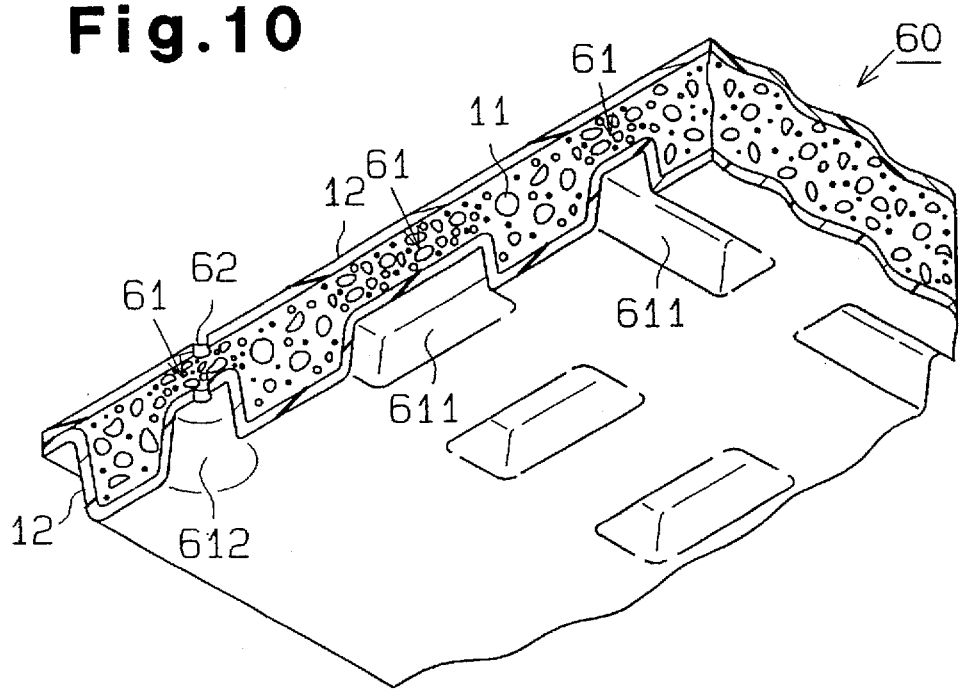
FIG. 10 is a schematic cross-sectional perspective view of soundproofing material according to a sixth embodiment of the present invention.
Figure 11:
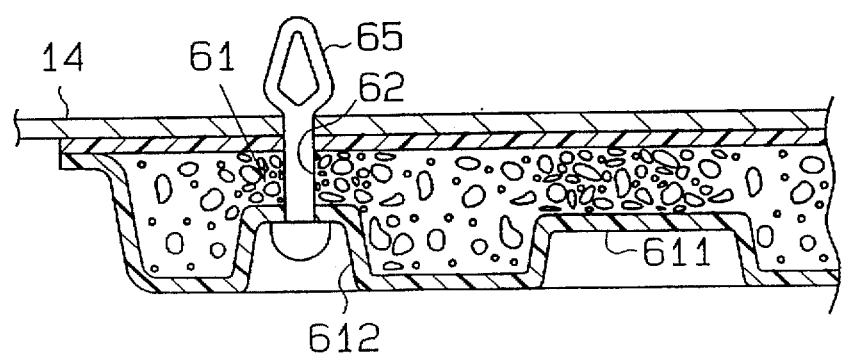
FIG. 11 is an enlarged cross-sectional view of the state where the soundproofing material according to the sixth embodiment is attached to a hood panel.

Next, a sixth embodiment of the present invention will be described referring to FIGS. 10 and 11. In the soundproofing material 60 according to the sixth embodiment, a plurality of high-density portions 61 are formed by partly compressing the lower covering layer 12 to provide portions thinner than the uncompressed portion of the rubber grain layer 11. These high-density portions 61 are formed, adjacent lower density portions, by partly heat-compressing the lower covering layer 12 at a temperature of 170° C. for 6 minutes and solidifying it as such. The thus formed high-density portions 61 defined on the soundproofing material 60 constitute recesses 611 having U-shaped cross-section or truncated conical recesses 612. In this embodiment, fitting holes 62 are formed so as to penetrate the soundproofing material 60 at the locations of the truncated conical recesses 612 to be able to receive mounting clips 65 therein as in FIG. 11, to attach soundproofing to a support 14. Also, other fitting holes (not shown) can be provided along the periphery of the soundproofing material 60 for mounting clips 65.

Next, actions and effects of the soundproofing material 60 according to the sixth embodiment will be described.

This sixth embodiment, like any of the foregoing embodiments, also enjoys the basic effect that the noises generated in the engine compartment are topically absorbed by a number of rubber grains themselves contained in the pulverized rubber layer 11 of the soundproofing material 60 and by air gaps present between the grains.

Further, since high-density portions 61 of the overall structure, and of rubber grain layer 11, which are thinner than the uncompressed portion, are formed by partly compressing the soundproofing material 60 in this embodiment, the density of the pulverized rubber layer 11 varies between compressed and uncompressed portions. Consequently, noises ranging over various frequency can be screened and absorbed by the pulverized rubber layer 11 having various density distributions. Meanwhile, the noted differences in the thickness of the soundproofing material 60 allows noises ranging over various frequency to be screened and absorbed depending on the thickness of the material 60.

The rubber grains present at the high-density portions 61 are restricted from migrating within the pulverized rubber layer 11. Also, the rubber grains present in the uncompressed portions are restricted from migrating by the presence of the high-density portions 61. Consequently, the rubber grains are prevented from biasing within the pulverized rubber layer 11, enabling efficient screening and absorption of the noises.

(Seventh Embodiment)

Figure 12:
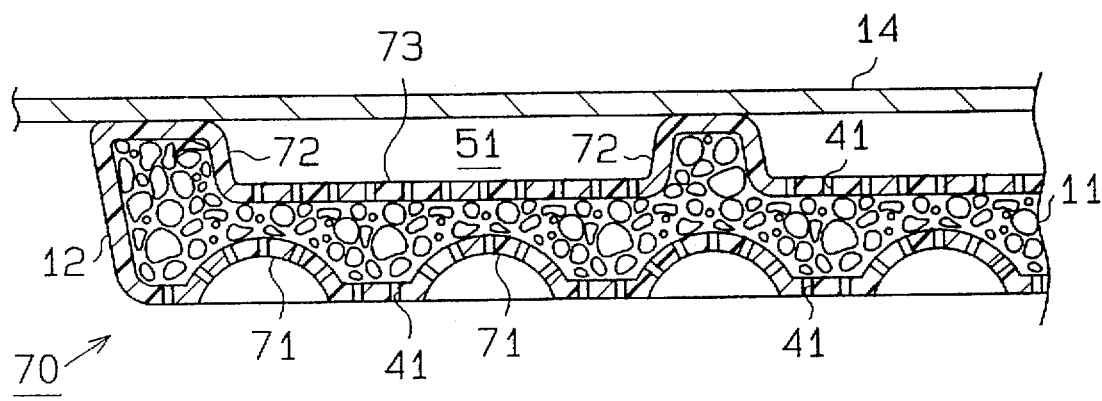
FIG. 12 is a schematic cross-sectional view of soundproofing material according to a seventh embodiment of the present invention.
Figure 13:
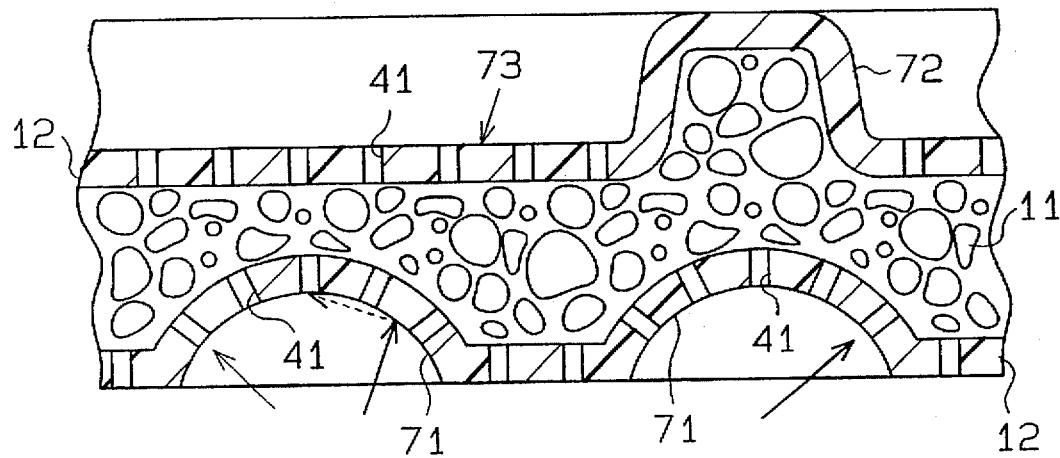
FIG. 13 is a partially enlarged cross-sectional view of soundproofing material according to the seventh embodiment.

Next, a seventh embodiment of the present invention will be described referring to FIGS. 12 and 13.

In the soundproofing material 70 according to the seventh embodiment, a plurality of dimple-like or hemispherical noise absorbing recesses 71 are formed on one of the covering layers 12 constituting the soundproofing material 70 to be opposed to the noise sources. FIG. 12 shows such dimples formed in the lower layer.

Meanwhile, ridges 72 are formed on the other covering layer 12 to be opposed to the hood panel 14 (upper layer in FIG. 12) at least along the periphery and partly in the middle; whereas the other portions having no ridge 72 constitute cavities 73. The crests of the ridges 72 are abutted against the hood panel 14 to define spaces surrounded by the hood panel 14 and the cavities 73, and these spaces serve as air pockets 51.

Further, the covering layers 12 have a plurality of through holes 41 on the side facing the noise sources and at the portions facing the cavities 73. These through holes 41 basically have a diameter smaller than those of the rubber grains so that grains may not escape through the through holes 41.

Next, actions and effects of the soundproofing material 70 according to the seventh embodiment will be described.

This seventh embodiment, like any of the foregoing embodiments, also enjoys the basic effect that the noises generated in the engine compartment are topically absorbed by a number of rubber grains themselves contained in the pulverized rubber layer 11 of the soundproofing material 70 and by air gaps present between the grains.

Meanwhile, as in the fourth embodiment, the through holes 41 are defined at predetermined portions of the covering layers 12, so that noises are readily allowed to impinge upon the pulverized rubber layer 11 through the through holes 41 and there to be absorbed easily by the pulverized rubber layer 11. Further, as in the fifth embodiment, the air pockets 51 are defined between the pulverized rubber layer 11 and the hood panel 14, so that noises having the frequency of interest can be absorbed effectively, thus enhancing the soundproofing characteristics.

Moreover, in this seventh embodiment, the dimple-like noise absorbing recesses 71 are formed on the covering layer 12 facing the noise sources. Accordingly, the surface area of the covering layer 12 facing the noise sources can be increased to increase the area to be brought into contact with the noise waves, as shown in FIG. 13. The noise waves are allowed to impinge more easily upon the covering layer 12 substantially perpendicular.

When noises impinge upon a part of the noise absorbing recess 71 of the covering layer 12, the changes that they are reflected to impinge upon other parts of the covering layer 12 are increased to ensure chances that the noises are absorbed. Accordingly, chances that noise waves impinging upon soundproofing material 70 at various angles are increased, and such noise waves are efficiently absorbed. Thus, the soundproofing material 70 exhibits excellent soundproofing performance.

Further, the noise absorbing recesses 71, cavities 73 and ridges 72 formed in this embodiment enhance rigidity of the soundproofing material 70 compared with those having flat surfaces. Consequently, transportation and fitting become facile, notably improving workability.

By virtue of these actions, sufficient soundproofing effect can be obtained, even if the pulverized rubber layer is made thinner. Accordingly, the entire weight of the soundproofing material 70 can be reduced.

(Eighth Embodiment)

Next, an eighth embodiment of the present invention will be described referring to FIG. 14.

Figure 14:
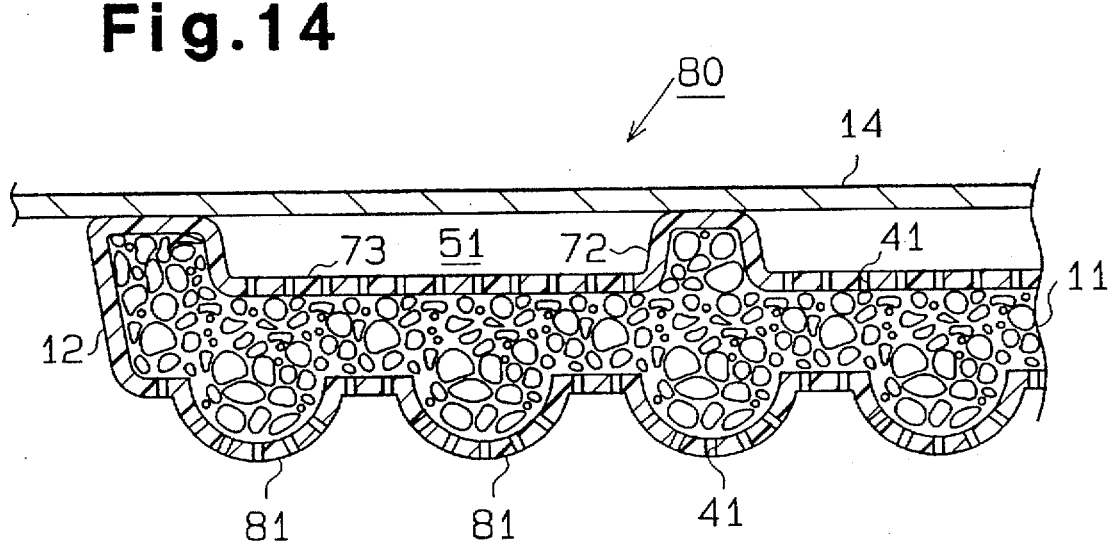
FIG. 14 is a schematic cross-sectional view of soundproofing material according to an eighth embodiment of the present invention.

As shown in FIG. 14, a plurality of outwardly extending hemispherical noise absorbing protrusions 81 are formed, in place of the noise absorbing recesses 71 as described with respect to the seventh embodiment, on one of the covering layers 12 constituting the soundproofing material 80 facing the noise sources. FIG. 14 protrusions 81 extend from the lower layer.

The similar actions and effects as in the seventh embodiment can be obtained also in the eight embodiment.

(Ninth Embodiment)

A ninth embodiment of the present invention will be described referring to FIGS. 15 to 18.

Figure 15:
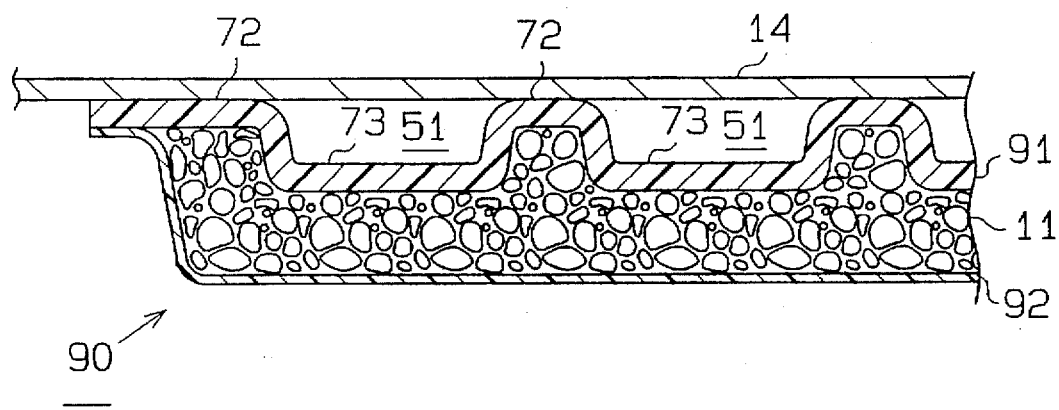
FIG. 15 is a schematic cross-sectional view of soundproofing material according to a ninth embodiment of the present invention.

As shown in FIG. 15, the soundproofing material 90 as a whole as a sheet-like form and includes a pulverized rubber layer 11, a felt layer 91 applied to cover the layer 11 on the side mounted against the hood panel 14, here the upper surface in FIG. 15. A nonwoven fabric layer 92 is applied to cover the layer 11 on the side facing the noise sources, here the lower surface in FIG. 15.

The felt layer 91 is, for example, of a relatively thick worsted nonwoven fiber layer. Meanwhile, the nonwoven fabric layer 92 is, for example, of a relatively thin Polychlal nonwoven fabric. The felt layer 91 constituting the upper layer and the nonwoven fabric layer 92 constituting the lower layer are fused or bonded together at the periphery so as to securely prevent the rubber grains from spilling outside. The soundproofing material 90 in this embodiment is attached to the hood panel 14 by fitting clips (not shown) at the periphery.

Ridges 72 are formed at least along the periphery and partly in the middle of the felt layer 91 constituting the soundproofing material 90, while the rest of the parts having no ridge 72 constitutes cavities 73. The crests of the ridges 72 abut the hood panel 14 to define air pockets 51 surrounded by the hood panel 14 and the cavities 73.

Next, actions and effects of the soundproofing material 90 according to the ninth embodiment will be described.

This embodiment, like any of the foregoing embodiments, also enjoys the basic effect that the noises generated in the engine compartment are topically absorbed by a number of rubber grains themselves contained in the pulverized rubber layer 11 of the soundproofing material 90 and by air gaps present between the grains.

Figure 16:
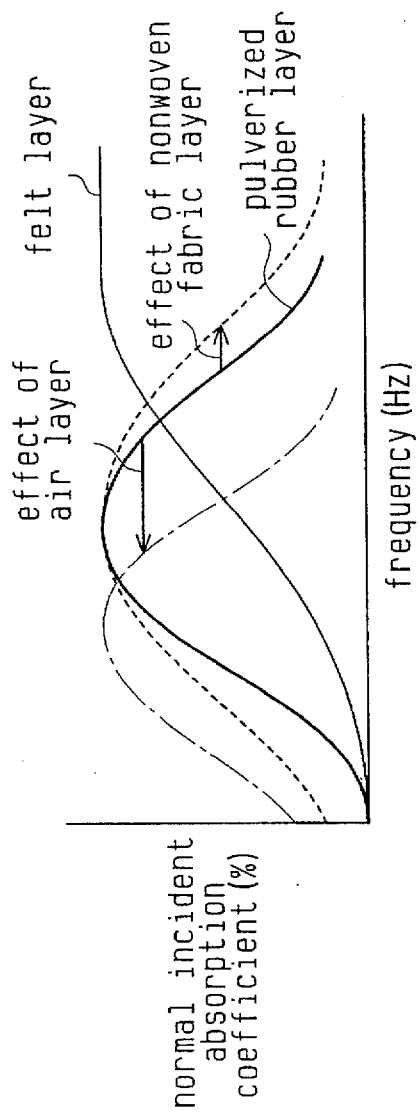
FIG. 16 is a graph relating to the ninth embodiment showing a relationship of frequency vs. normal incident absorption coefficient in each layer.
Figure 17:
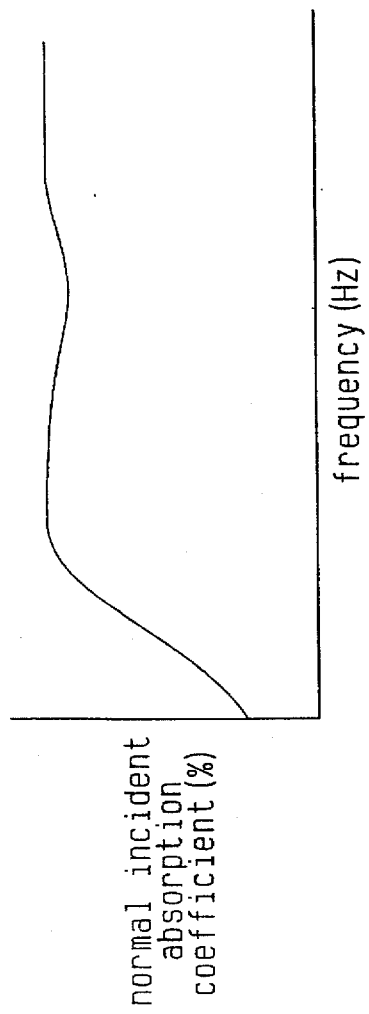
FIG. 17 is a graph showing an ideal relationship of frequency vs. normal incident absorption coefficient obtained by superposing the acoustic absorptivity curves shown in FIG. 16.

In this embodiment, noises with relatively high frequency are mainly absorbed by the felt layer 91, as shown by the thin line in FIG. 16. Meanwhile, noises with relatively low frequency are mainly absorbed by the pulverized rubber layer 11 covered with the felt layer 91 and the nonwoven fiber layer 92, as shown by the thick line. Further, noises ranging over a wider frequency, shown by the broken line, than those absorbed by the pulverized rubber layer 11, which absorb noises of relatively low frequency levels, can be reduced by the nonwoven fabric layer 92 provided in this embodiment.

In addition, the air pockets 51 provided in this embodiment increase overall acoustic absorptivity, and sufficient soundproofing effect can be exhibited even when the pulverized rubber layer 11 is reduced in thickness. Accordingly, the entire weight of the soundproofing material 90 can be reduced.

Meanwhile, various sound generating units, including the engine, the induction system and the transmission, are disposed in the engine compartment and they generate noises ranging over various frequency levels. However, according to the soundproofing material 90 in this embodiment, these noises ranging over various frequency can be surely absorbed. In other words, the soundproofing material 90 can theoretically shown high level acoustic absorptivity characteristic against the noises ranging over various frequency as shown by the characteristic curve in FIG. 17 obtained by superposing the acoustic absorptivity curves shown in FIG. 16.

Next, the following test was carried out so as to confirm the above actions and effects. In this test, a sample was prepared of the soundproofing material 90 in which rubber grains of various kinds, various grain sizes and various structures are covered with the felt layer 91 and nonwoven fabric layer 92, and acoustic absorptivity was measured by changing the frequency level. The results are shown in FIG. 18.

Figure 18:
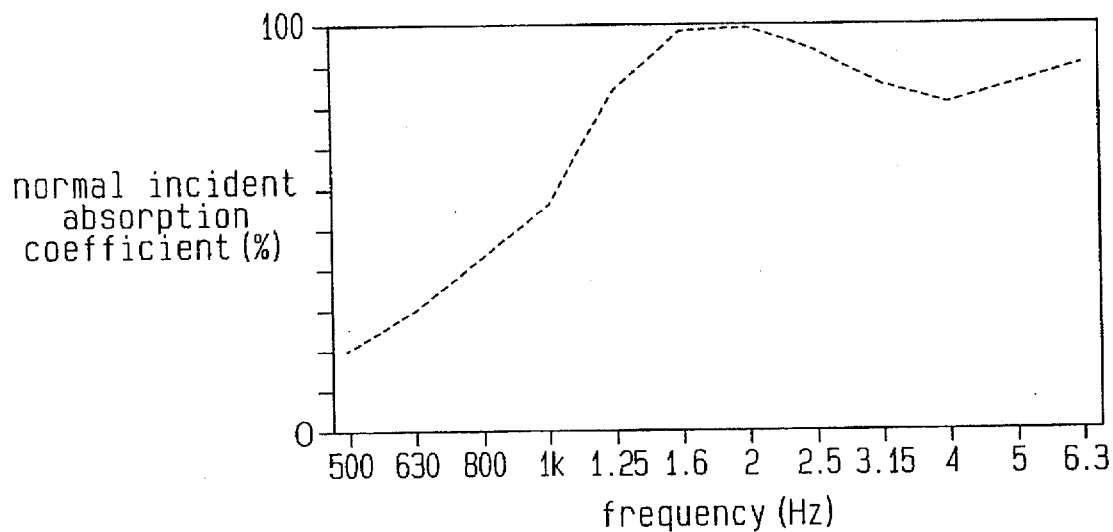
FIG. 18 is a graph showing a relationship of frequency vs. normal incident absorption coefficient in the soundproofing material according to the ninth embodiment.

As shown in FIG. 18, it can be understood that the sample of the soundproofing material 90 according to this embodiment exhibits high noise absorbing effect over the entire frequency of the noises. Particularly, it can be appreciated that the noises in the relatively low frequency region of less than 2 kHz are absorbed. Therefore, the soundproofing material 90 according to the ninth embodiment efficiently absorbs noises of low frequency which can also annoy the driver and those who are around the vehicle benefit from excellent soundproofing performance.

(Tenth Embodiment)

Figure 19:
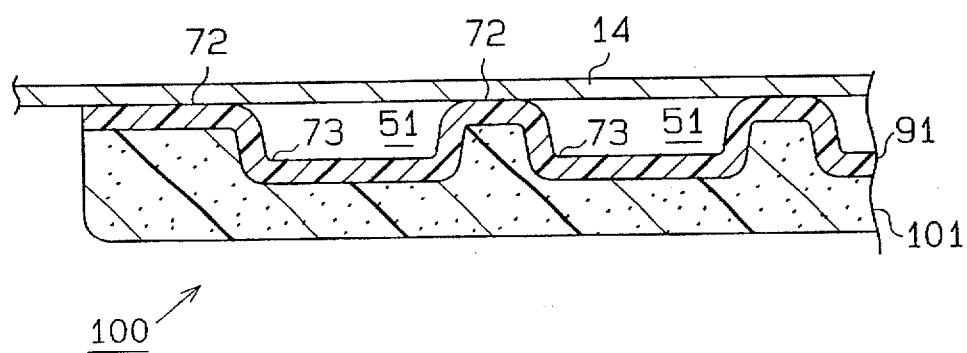
FIG. 19 is a schematic cross-sectional view of soundproofing material according to a tenth embodiment of the present invention.

Next, a tenth embodiment of the present invention will be described referring to FIGS. 19 and 20. As shown in FIG. 19, the soundproofing material 100 as a whole has a sheet-like form and is comprised of a felt layer 91 and an elastic sheet layer 101 which is an open-cell foamed elastic sheet laminated with the felt layer 91.

The open-cell foamed elastic sheet constituting the elastic sheet layer 101 is, for example, of open-cell foamed polyurethane and contains a number of foams.

Meanwhile, the felt layer 91 is, for example, of a relatively thick worsted nonwoven fiber layer, as described above. Incidentally, the felt layer 91 and the elastic sheet layer 101 in this embodiment are bonded to each other by an adhesive. However, these layers 91, 101 need not be bonded over the entire surfaces but may be bonded partially. Alternatively, they may be fastened together by means of pins and the like at the periphery.

Next, actions and effects of the soundproofing material 100 according to the tenth embodiment will be described.

In this embodiment, the elastic sheet layer 101 mainly absorbs the noises in the relatively low frequency region in place of the pulverized rubber layer 11 as used in the ninth embodiment. In other words, the noise waves, i.e., the air compression waves, impinged upon the elastic sheet layer 101 are transmitted to the air in the cells, and the energy of the noises is reduced by the viscosity resistance and heat transmission of the air. Accordingly, the same actions and effects as in the first embodiment can be exhibited again in the tenth embodiment.

The following test was carried out so as to confirm the above actions and effects. In this test, a sample was prepared of the soundproofing material 100, and its acoustic absorptivity was measured by changing the frequency level. The results are as shown in FIG. 20.

Figure 20:
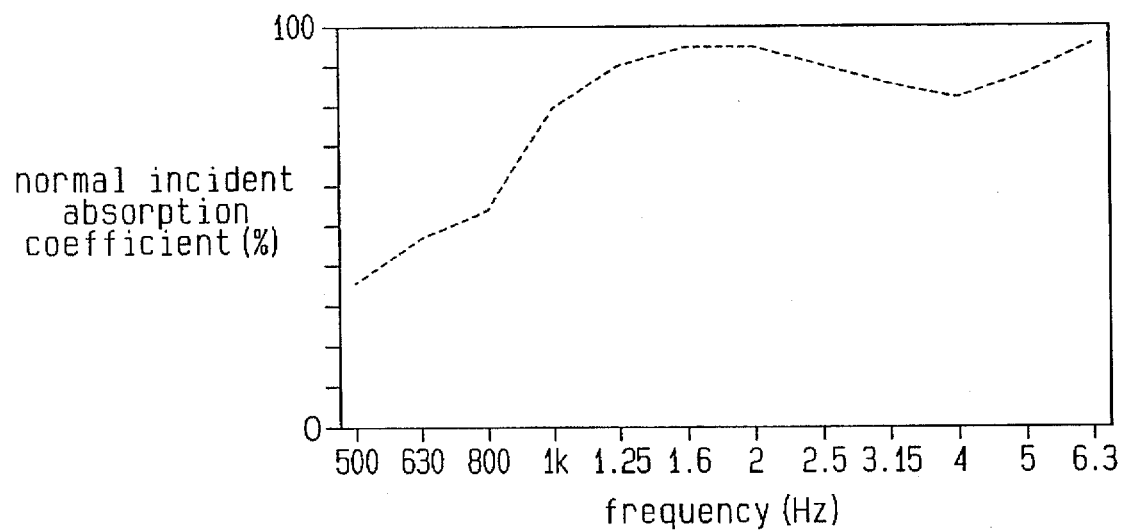
FIG. 20 is a graph showing a relationship of frequency vs. normal incident absorption coefficient in the soundproofing material according to the tenth embodiment of the invention.

As shown in FIG. 20, it can be understood that the sample of the soundproofing material 100 according to this embodiment exhibits high noise absorbing effects over the entire frequency of the noises like in the ninth embodiment. Particularly, it can be understood that the noises in the relatively low frequency region of less than 2 kHz are absorbed. Accordingly, the soundproofing material 100 according to this embodiment efficiently absorbs noises of low frequency levels, thus exhibiting excellent soundproofing performance.

(Eleventh Embodiment)

Figure 21:
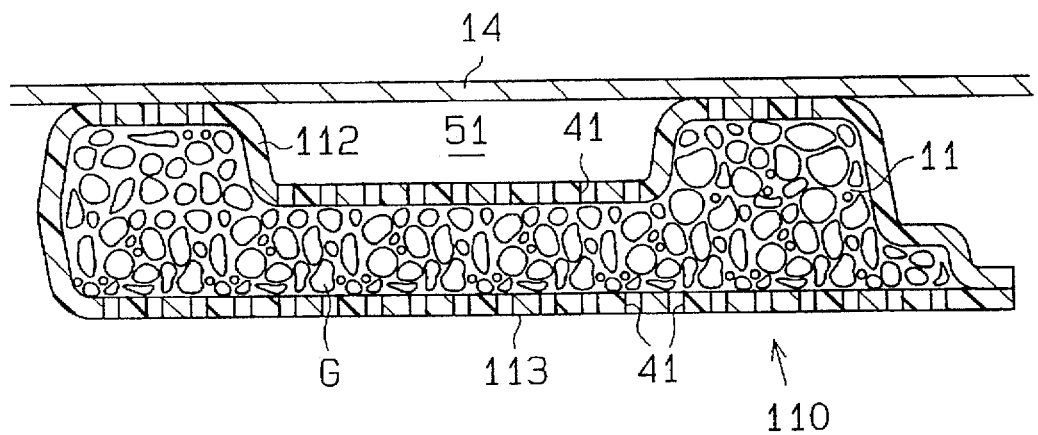
FIG. 21 is a schematic cross-sectional view of soundproofing material produced by the process according to an eleventh embodiment of the invention.

Next, an eleventh embodiment of the present invention will be described referring to FIGS. 21 to 26. As shown in FIG. 21, the soundproofing material 110 according to this embodiment has a pulverized rubber layer 11 comprised of rubber grains of various kinds, various grain sizes and various shapes, and a bag-like covering layer 111 formed by blow-molding, in which the rubber grains are contained. An upper layer 112 and a lower layer 113 together constitute the covering layer 111 and include a plurality of through holes 41. These through holes 41 are defined at a predetermined pitch and are adapted to have a diameter smaller than the grain size of the rubber grains so that the rubber grains may not spill out of the through holes 41. Further, a plurality of air pockets 51 are defined between the upper layer 112 and the hood panel 14.

Figure 22:
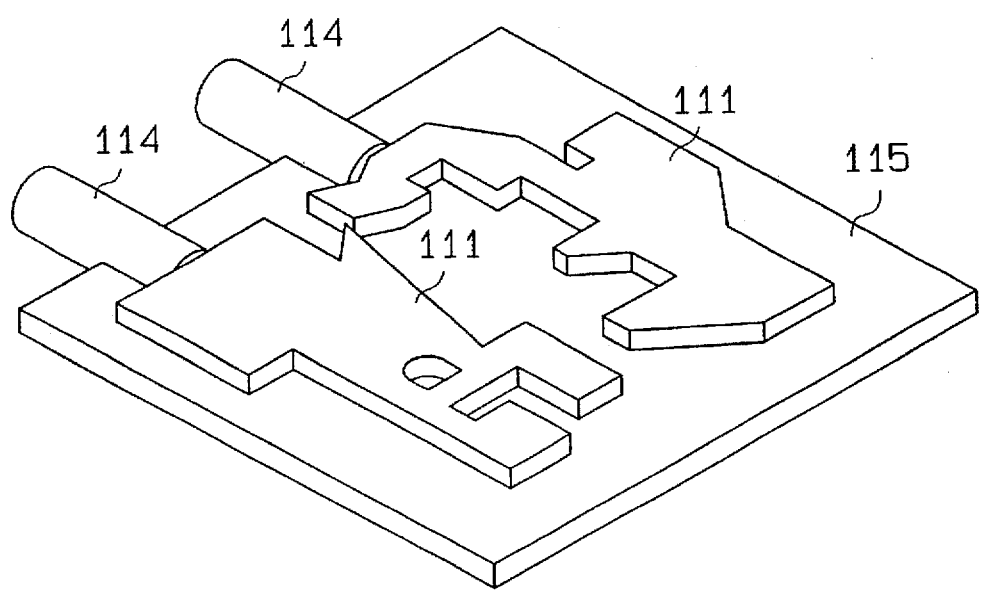
FIG. 22 is a perspective view of a shell formed by blow molding.
Figure 23:
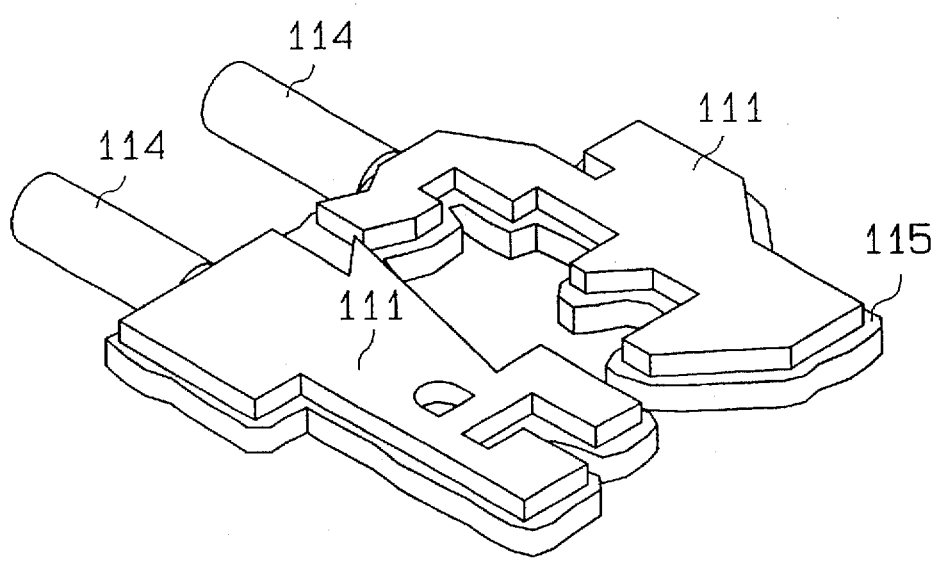
FIG. 23 is a perspective view showing a deburring step.
Figure 24:
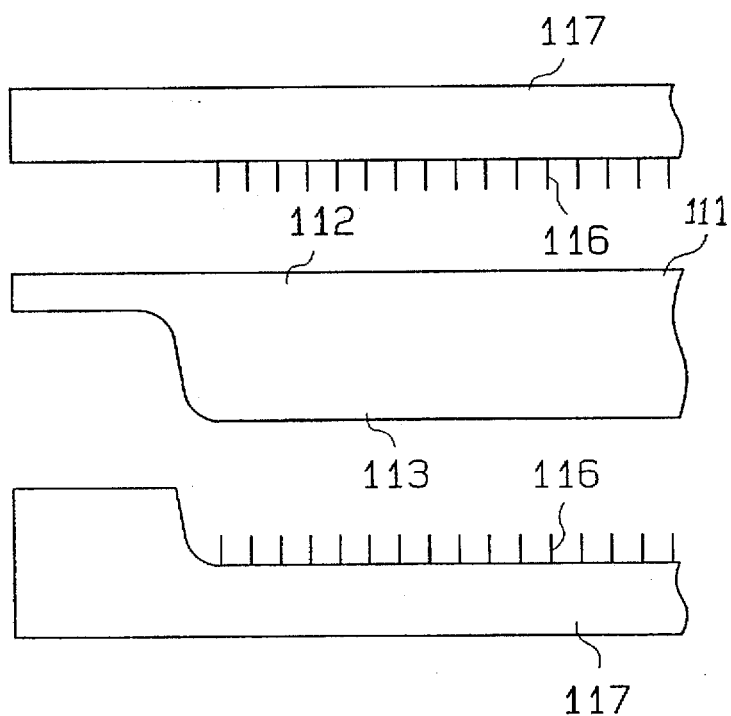
FIG. 24 is a perspective view showing a step of forming through holes.

Next, a process for producing the soundproofing material 110 will be described. In this embodiment, extrusion blow molding method is employed. A plasticized PP is extruded from an extruder to form a hollow parison (not shown), and the parison is placed in blow molding dies (not shown) and then using conventional blow molding techniques, the hollow parison is subjected to blow molding to thereby form the covering layer 12 having a predetermined shape, as shown in FIG. 22. Reference number 114 denotes blowing ports formed when blow molding was carried out. Then, unnecessary portions of the burrs 115 present around the covering layer 111 are cut off, as shown in FIG. 23. Subsequently, as shown in FIG. 24, a plurality of the through holes 43 are produced on the upper layer 112 and the lower layer 113 by a pair of punches 117, each having a multiplicity of needles 116.

Figure 25:
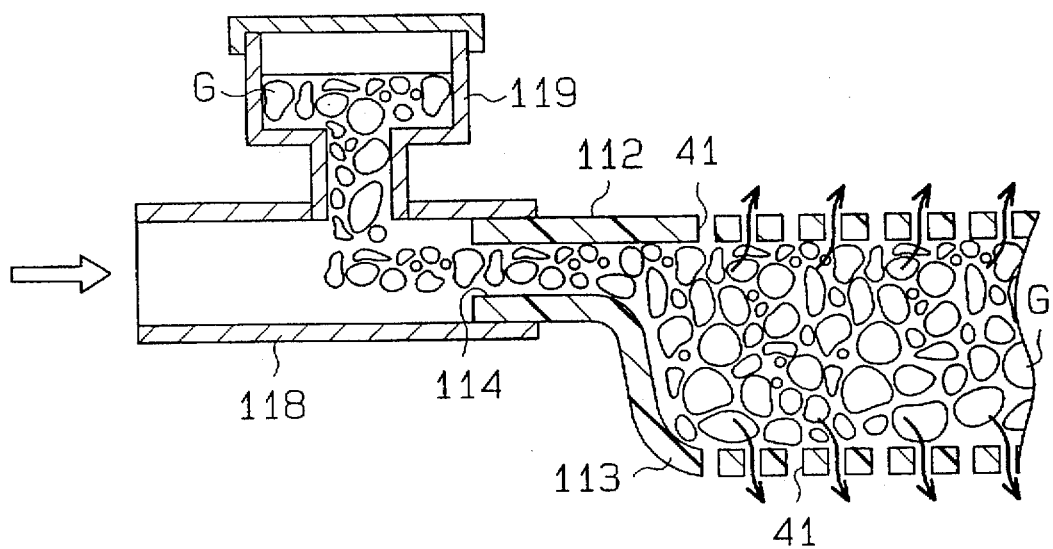
FIG. 25 is a perspective view showing a step of forming through holes.
Figure 26:
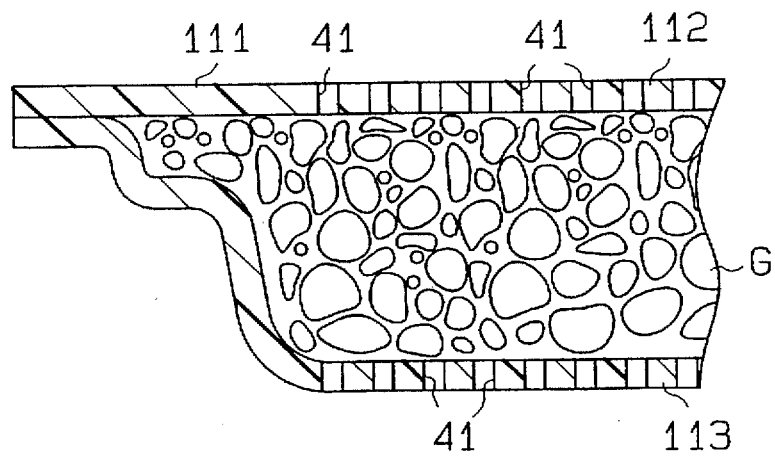
FIG. 26 is a perspective view showing a step of sealing a packing port.

Next, the filling ports (blowing port) 114 provided in the covering layer 111 are connected to filling pipes 118, as shown in FIG. 25. Each filling pipe 118 is connected to an air compressor (not shown) and is provided with a hopper 119 containing rubber grains G. The air compressor (not shown) is then operated to feed compressed air through the filling pipes 118 into the covering layer 111. The feeding of compressed air allows the rubber grains G to be fed from the hoppers 119 into the covering layer 111 together with the compressed air. The compressed air fed into the covering layer 111 escapes through the through holes 41 to the outside. However, since the grain size of the rubber grains G is greater than the diameter of the through holes 41, they do not flow through or spill out of the through holes 41. In transporting the rubber grains G, vibration is applied to the covering layer 111 by a vibrator (not shown), so that the rubber grains G are packed evenly in the covering layer 111. Subsequently, as shown in FIG. 26, the filling ports 114 are heat-sealed as shown at 120.

Now, actions and effects of the eleventh embodiment will be described.

Since the covering layer 111 is formed by blow molding in this embodiment, even a complicated three-dimensional shape can be easily molded. Accordingly, not only flexibility in the designing of the covering layer 111 can be increased, but also the cost of producing the dies can be reduced.

Further, since the rubber grains G are filled in the covering layer 111 with the aid of compressed air, they can be filled fully into every nook and corner of the covering layer 111 having a complicated three-dimensional shape. Besides, since vibration is applied to the covering layer 111 during filling of the rubber grains G, the effect of filling the rubber grains G into the covering layer 111 with the aid of compressed air can be further enhanced, and also the rubber grains G can be placed evenly within the covering layer 111.

Although only eleven embodiments of the present invention have been described herein, it should be apparent to those skilled in the art that the present invention may be embodied in many other specific forms without departing from the spirit or scope of the invention. Particularly, it should be understood that the present invention may be embodied in the following manner:

(1) While the soundproofing material is designed to be applied to a hood panel 14 in the engine compartment in any of the foregoing embodiments, the soundproofing material may be applied to other automotive parts and members including roof panels, wheel housings, floor panels and engine covers, as well as to other portions where it is desirable to reduce noise.

(2) While the pulverized rubber layer 11 comprises a mixture of rubber grains of various kinds of materials, various shapes and various sizes in any of the foregoing embodiments, the grains may be allowed to be present in a kind, shape or size distribution where the kinds of material, their shapes and sizes could be the same or could include variations thereof with a device. The rubber grains may be intentionally be present with a kind, shape or size distribution depending on the area of use. Further, the through holes 41 and the air layers 22, 51 may be intentionally distributed in a variety of patterns in locations.

For example, the rubber grains present around the engine are of different kinds of materials, different grain size and different structures from those of the rubber grains present around the induction system, so that the rubber grains may be constituted to exhibit acoustic absorptivity characteristics depending on the individual noise generating members. In such a situation, even though there are different noise sources, the noises can be screened and absorbed efficiently by selecting the kinds, grain sizes and structures of the rubber grains corresponding to the frequency of the noises to be absorbed.

Meanwhile, in the soundproofing material 60 having the high-density portions 61 according to the sixth embodiment of the invention, since the rubber grains present at the uncompressed portion are prevented form migrating by the presence of the high-density portions 61, the above effects can be maintained over an extended period.

(3) In any of the foregoing embodiments except the ninth embodiment, spilling out of the rubber grains is prevented by covering the pulverized rubber layer 11 with the covering layers 12 and 21, and in the ninth embodiment, with the felt layer 91 and the nonwoven fabric layer 92. However, the rubber grains may be restrained by other mean sin place of or in addition to such layers. For example, the rubber grains in the pulverized rubber layer 11 may be incorporated with a material among the rubber grains, for example, a fiber, a pellet, a net or a film of a synthetic resin such as of PET, PA, PVC and PE, which is heat-fused and then solidified, or an adhesive. Alternatively, a liquid rubber may be applied to the rubber grains to be vulcanized to adhere the rubber grains to one another. By employing such restricting means, the individual rubber grains are restricted from migrating and also prevented from spilling out. When the rubber grains are securely restricted by such techniques, the covering layers 12 or 21 can be omitted.

(4) In each of the foregoing embodiments except the tenth embodiment, rubber grains are employed as a granular elastic body to constitute the pulverized rubber layer 11. However, a foamed elastic body which is allowed to have elasticity by foaming such as a ground polyurethane foam and the like or a granular molding may be employed in place of the rubber grains to constitute the foamed elastic body layer. The material of the foamed elastic body is not particularly limited, and any materials, including rubber foam, can be employed as well as the polyurethane foam.

(5) While ridges 72 are formed on the soundproofing material to define air pockets 51 between the soundproofing material and the hood panel 14 in some of the foregoing embodiments, the constitution of the air pockets 51 is not particularly limited so long as they are defined at least by the hood panel 14 and the pulverized rubber layer 11. For example, a case having a flange may be attached to the hood panel 14 and a sheet-like soundproofing material may be attached to the flange by clips. Thus, an air layer can also be formed, and the same actions and effects as in the foregoing embodiments can be obtained. Alternatively, the air pockets 51 can be omitted.

(6) While air pockets 22 are designed to be defined in the upper covering layer 12 in the second embodiment, the air pockets 22 may be used in the lower covering layer 12 or also in the upper and lower covering layers 12. The secondary soundproofing means may not be limited particularly to the air pockets 22, but may be formed within the rubber or the foam material.

Figure 27:
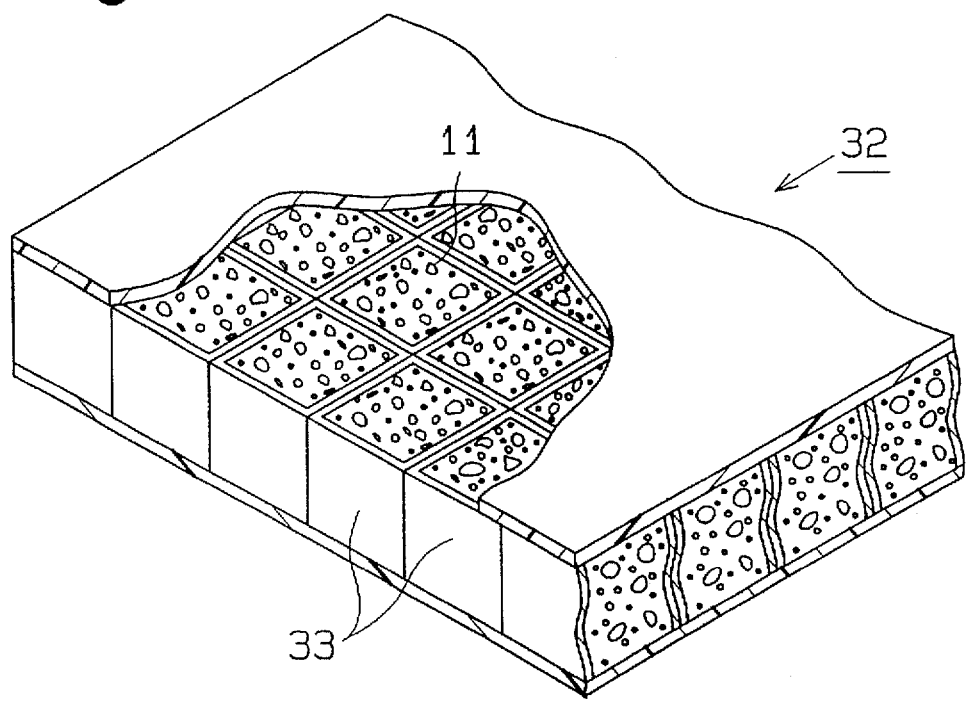
FIG. 27 is a partially cut-away schematic perspective view of soundproofing material according to another embodiment of the present invention.

(7) While a grid-like partition 31 is employed in the pulverized rubber layer 11 in the third embodiment, there may be employed separating boxes 33, as shown in FIG. 27, which separate the space in the soundproofing material 32 into box-like units or cells. Such a construction facilitates filling of the rubber grains and production of the soundproofing material 32.

Figure 28:
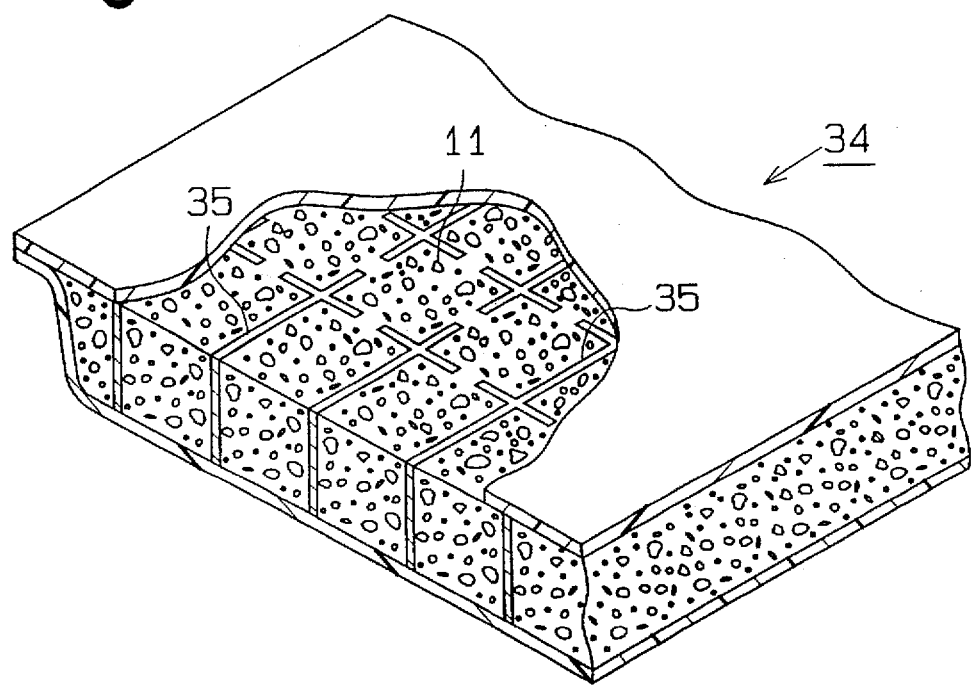
FIG. 28 is a partially cut-away schematic perspective view of soundproofing material according to another embodiment of the present invention.

Meanwhile, as shown in FIG. 28, a partition 35 for defining unit cells in the soundproofing material 34 may be allowed to have some openings or passageways 35a. This structure achieves continuous distribution of the rubber grains.

Figure 29:
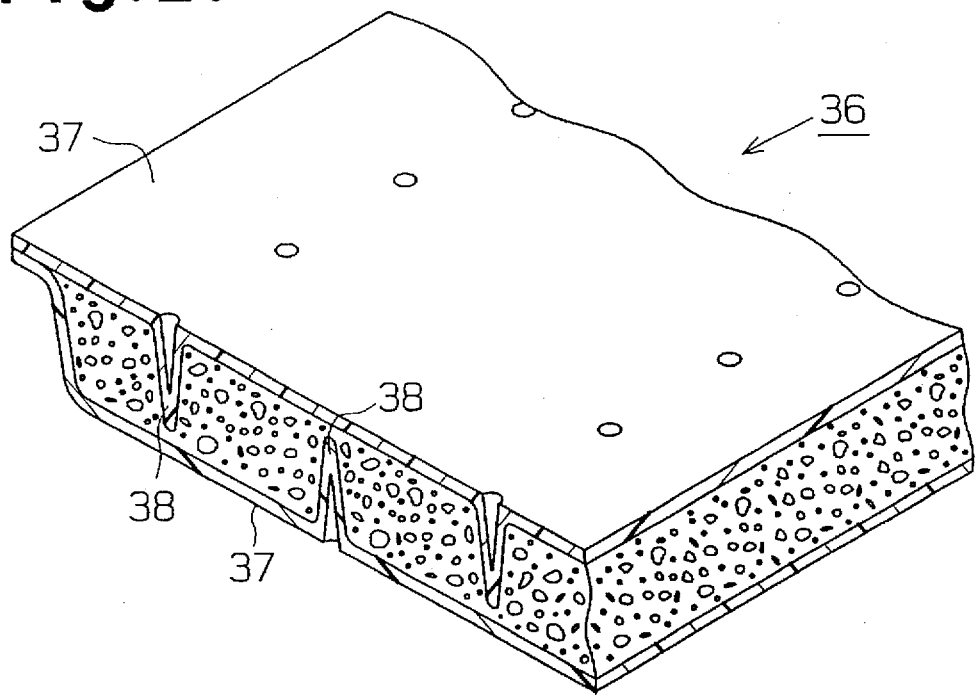
FIG. 29 is a partially cut-away schematic perspective view of soundproofing material according to another embodiment of the present invention.

Further, as shown in FIG. 29, inwardly directed protrusions 38 may be formed integrally with the covering layers 37 constituting the soundproofing material 36. This construction leads to omission of the partition structure previously shown in FIG. 4 and the like, and improves workability during production of the soundproofing material 36. These protrusions 38 may be utilized as registration marks when the pulverized rubber layer 11 is formed.

Figure 30:
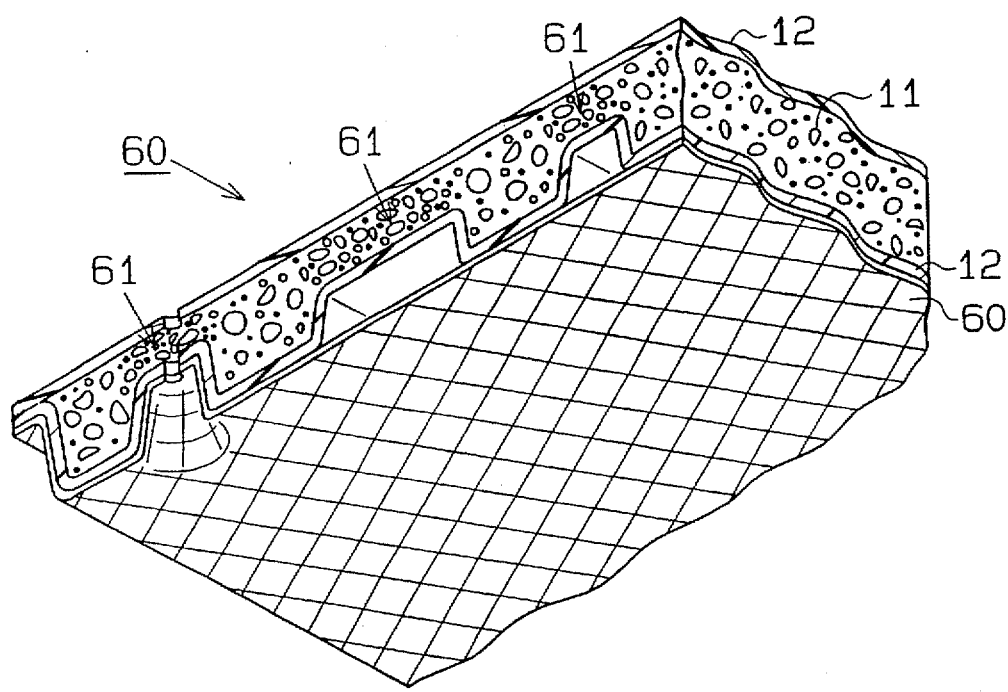
FIG. 30 is a partially cut-away schematic perspective view of soundproofing material according to another embodiment of the present invention.

(8) As shown in FIG. 30, a net-like secondary sound insulation material 66, for example, may be applied on the soundproofing material 60 of the sixth embodiment on the side facing the noise sources. Such structure further improves the protective properties of the soundproofing material 60 and also its sound insulating performance.

Figure 31:
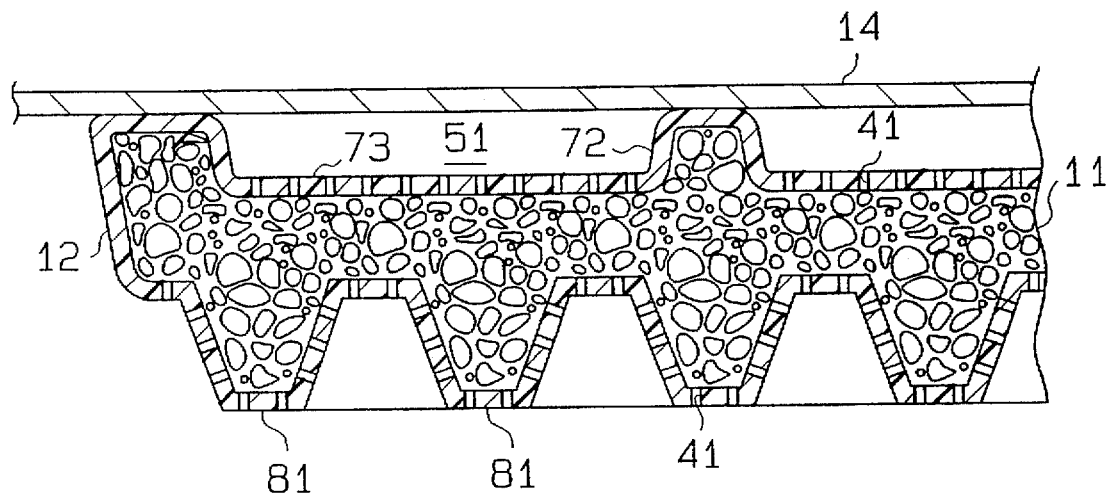
FIG. 31 is a partially cut-away schematic perspective view of soundproofing material according to another embodiment of the present invention.
Figure 32:
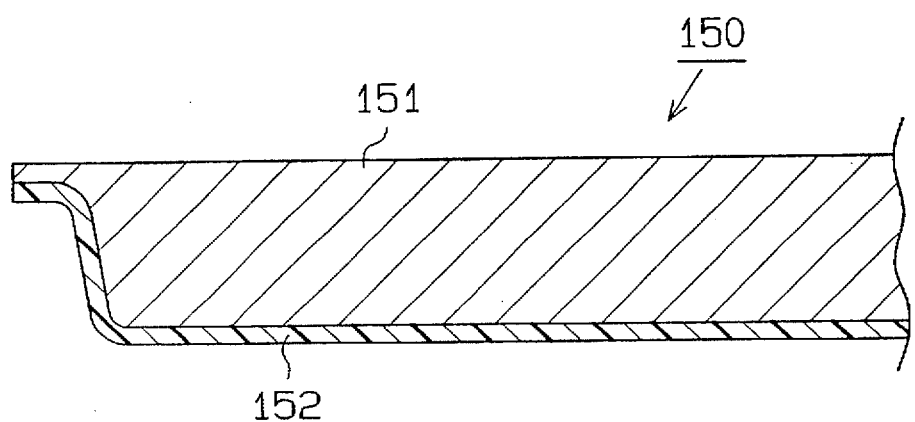
FIG. 32 is a schematic cross-sectional view of a prior art soundproofing material.
Figure 33:
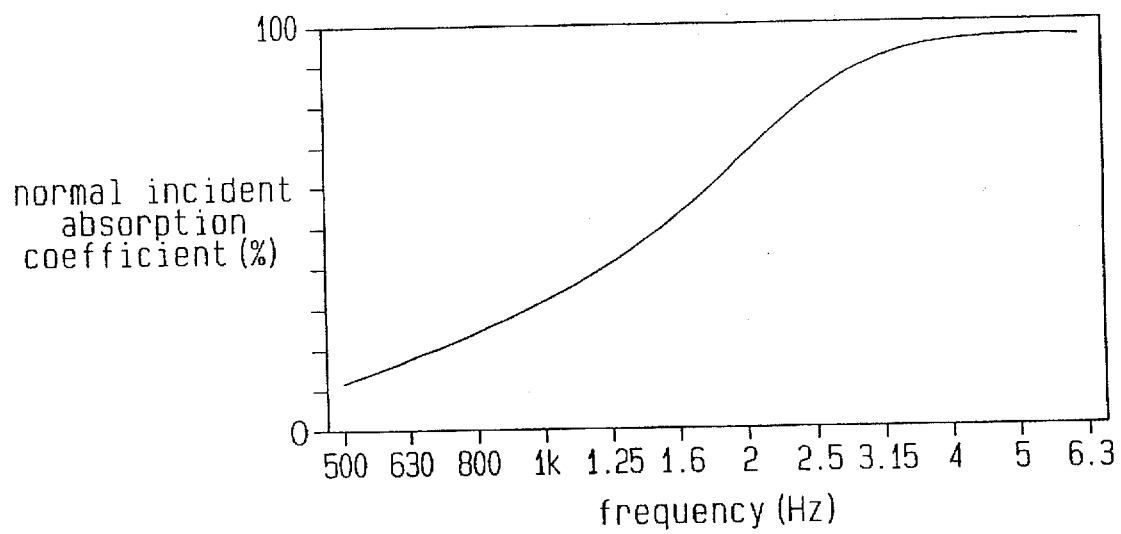
FIG. 33 is a graph showing a relationship of frequency vs. normal incident absorption coefficient in the prior art soundproofing material.

(9) The shapes of the protrusions and recess in the seventh and eighth embodiments are not limited to those as described respectively, but may be of any shape so long as they substantially increase the surface area. For example, as shown in FIG. 31, the hemispherical noises absorbing protrusions 81 in the eighth embodiment may be replaced by noise absorbing protrusions 82 having a trapezoidal cross-section (e.g., having a truncated conical shape).

(10) While a felt layer 91 is employed in the ninth and tenth embodiments, so as to absorb high-frequency waves, the felt layer 91 may be replaced by or combined with a glass wool layer which is allowed to serve as a high-frequency absorbing layer.

(11) The arrangements and orders of the respective layers in any of the foregoing embodiments are shown merely as examples, and the present invention is not to be limited to such constructions.

(12) While the blowing ports formed during the blow molding are utilized as the filling ports 114 in the eleventh embodiment, another filling port may be formed instead of utilizing the blowing ports, and the rubber grains may be introduced through the filling port. In this case, the blowing ports shall also be heat-sealed.

(13) While extrusion blow molding method is employed in the eleventh embodiment, the present invention is not limited to such method but may be formed by other blowing methods.

Therefore, the present examples and embodiments are to be considered as illustrative and not restrictive and the invention is not to be limited to the details given herein, but may be modified within the scope of the appended claims.

What is claimed is:

1. A soundproofing insulator interposed between a source of noise and a member for supporting the insulator to limit propagation of noise from the source to the support member, the soundproofing insulator comprising:

a multiplicity of elastic grains for absorbing the noise transmitted from the noise source;

a housing enclosing the elastic grains, the housing having a first layer wall contacting the support member and a second layer wall facing the noise source, the second layer wall including a plurality of through holes having a diameter smaller than a minimum dimension of each elastic grain whose passage is to be prevented; and a plurality of air pockets defined between the first layer and the support member.

2. The soundproofing insulator as set forth in claim 1, wherein the elastic grains are different from each other in at least one of shape and size.

3. The soundproofing insulator as set forth in claim 1, wherein the elastic grains include at least two kinds of grains and each kind of grain is composed of a different material.

4. The soundproofing insulator as set forth in claim 1 wherein the second layer wall includes a plurality of concave recesses formed therein.

5. The soundproofing insulator as set forth in claim 1 wherein the first layer wall comprises a non-woven fabric.

6. The soundproofing insulator as set forth in claim 1 wherein the second layer wall includes a plurality of concave recesses formed therein and the through holes have varying diameters and varying lateral spacing.

7. The soundproofing insulator as set forth in claim 1 wherein the elastic gains include at least one partially compressed portion.

8. The soundproofing insulator as set forth in claim 1 further comprising a partition within the housing.

9. The soundproofing insulator as set forth in claim 1 wherein the first layer wall includes a plurality of through holes having a diameter smaller than a minimum dimension of each elastic grain whose passage is to be prevented.

10. The soundproofing insulator as set forth in claim 4 wherein the first layer wall includes a plurality of through holes having a diameter smaller than a minimum dimension of each elastic grain whose passage is to be prevented.

11. The sound insulator set forth in claim 1 wherein the second layer wall includes a plurality of convex projections formed thereon.

12. The sound insulator as set forth in claim 11 wherein the first layer wall includes a plurality of through holes having a diameter smaller than a minimum dimension of each elastic grain whose passage is to be prevented.

13. The sound insulator as set forth in claim 11 wherein the through holes of the second layer wall have varying diameters and varying lateral spacing.

14. The sound insulator as set forth in claim 11 wherein the first layer wall comprises a non-woven fabric.

* * * * *